Figure 1:
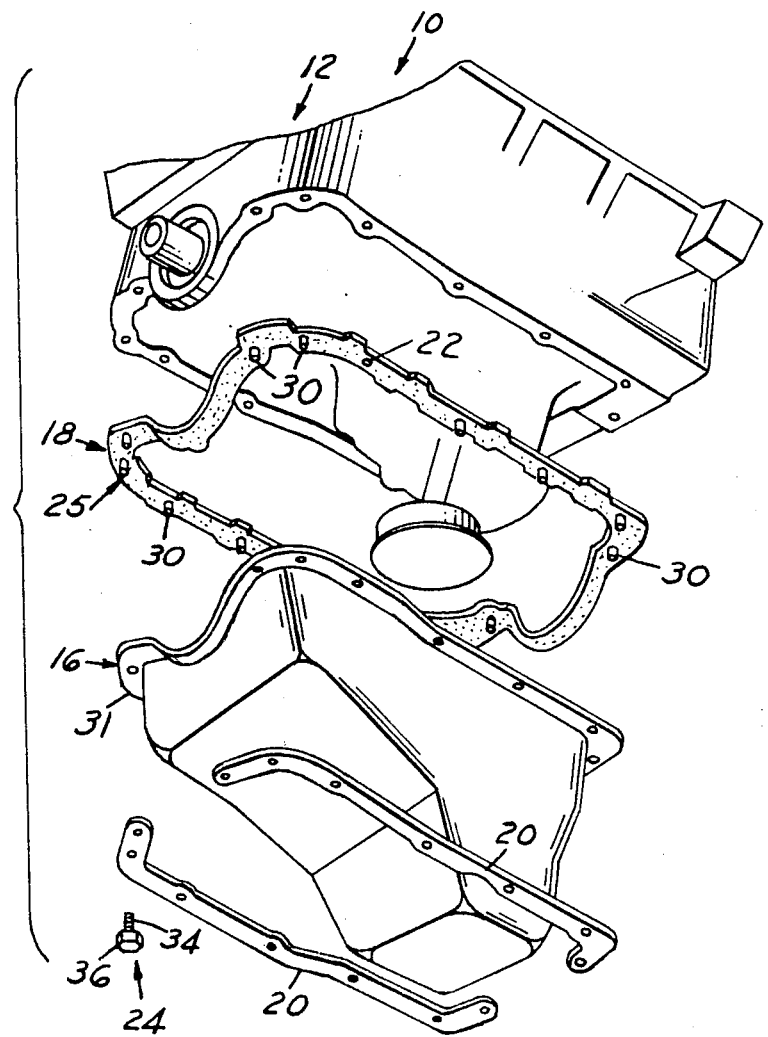

United States Patent [19]

Scott et al.

[11] Patent Number: 4,784,396

[45] Date of Patent: Nov. 15, 1988

[54] RETAINING CLIP AND GASKET FOR ENGINE SUBASSEMBLY

[75] Inventors: Joseph E. Scott, Milford; Frank V. Crocco, Utica, both of Mich.

[73] Assignee: Ford Motor Company, Dearborn, Mich.

[21] Appl. No.: 56,071

[22] Filed: Jun. 1, 1987

[51] Int. Cl.⁴ .................... F16J 15/12; F16B 13/06
[52] U.S. Cl. ................... 277/235 B; 277/166; 411/111; 411/182
[58] Field of Search ............... 277/166, 235 B, 235 R; 411/105, 107, 111, 112, 177, 180, 181, 182, 512, 999

[56] References Cited

U.S. PATENT DOCUMENTS

| | | |
|---|---|---|
| 1,970,078 | 8/1934 | Dillon . |
| 1,980,335 | 11/1934 | Hewitt et al. . |
| 2,210,453 | 8/1940 | Ginn ........................ 277/235 B |
| 2,477,429 | 7/1949 | Swanstrom et al. ............ 411/111 |
| 2,745,521 | 5/1956 | White . |
| 3,020,947 | 2/1962 | McKelvey ..................... 411/111 |
| 3,643,968 | 2/1972 | Horvath . |
| 3,701,373 | 10/1972 | Wronke et al. ................ 411/182 |
| 4,394,853 | 7/1983 | Lopez . |
| 4,535,996 | 8/1985 | Cardis et al. . |

FOREIGN PATENT DOCUMENTS

| | | |
|---|---|---|
| 962561 | 2/1975 | Canada ........................ 411/177 |
| 3321425 | 12/1984 | Fed. Rep. of Germany ... 277/235 B |
| 3329418 | 2/1985 | Fed. Rep. of Germany ... 277/235 B |
| 6415320 | 7/1966 | Netherlands .................. 411/111 |

Primary Examiner—Robert S. Ward
Attorney, Agent, or Firm—Robert E. McCollum; Clifford L. Sadler

[57] ABSTRACT

A plastic one-piece tubular clip has a base portion embedded in the bolt mounting hole of each of the holes of an engine oil pan gasket, and a tubular shaft portion that projects through the aligned holes of an oil pan rail and an oil pan reinforcing plate, and through which the oil pan mounting bolts are inserted, the tubular portion having internal ridges or teeth to grip the shank of the bolt with its head portion butting up against the bottom of the reinforcing plate to resiliently lock all the pieces together as a subassembly so that the oil pan can be easily assembled to the engine merely by raising the oil pan up against the crankcase with one hand and then pushing each one of the bolts up into their mounting holes and tightening the same with the other hand.

4 Claims, 2 Drawing Sheets

RETAINING CLIP AND GASKET FOR ENGINE SUBASSEMBLY

This invention relates in general to an automotive type internal combustion engine. More particularly, it relates to a clip molded into a gasket for retaining parts of an engine subassembly together prior to its attachment to the engine proper.

It is a primary object of the invention to provide a means for facilitating the attachment of an oil pan gasket and the oil pan or the like to an engine through the use of a subassembly consisting of several parts resiliently held together by a retaining clip molded into the gasket.

The attachment of an oil pan to the crankcase of an internal combustion engine conventionally consists of, for example, the steps of first applying a bead of silicone sealant to the underside of the crankcase to which the oil pan is to be attached, positioning the oil pan gasket on the crankcase in the sealant aligning the gasket holes with the bolt holes, installing the oil pan up against the gasket, in some cases installing reinforcement plate(s) on the underside of the oil pan rail or mounting flange, and, finally, attaching the whole assembly together by installing the attachment or fastening screws or bolts through the aligned holes in the reinforcing plate, oil pan and gasket.

One problem that arises with such an installation, however, is that if the gasket and other holes are not accurately aligned, or, if in hand-mounting the oil pan to the gasket and subsequently the bolts or screws, the gasket moves or the bolts stretch the walls of the holes, leakage may occur at these points.

A more accurate and reliable manner of attachment of a gasket and the oil pan is provided by the invention by establishing a subassembly consisting of the gasket, the oil pan, the reinforcing plates, if used, and the fastening screws or bolts, all together as a subassembly by means of a retaining clip molded into the gasket. The clip projects through the various parts for a resilient retention type engagement with the fastening screws or bolts whereby the whole subassembly can be subsequently attached to the engine crankcase merely by positioning all of the screws or bolts simultaneously up into the corresponding crankcase holes, thus assuring attachment of the gasket to the engine block without stretching or damage to the same.

The use of retainer clips to fasten a gasket or some other related portion to an engine is known in general. For example, U.S. Pat. No. 2,745,521, White, shows a hat shaped metal retainer adapted to be inserted through a gasket hole into the threaded socket of a crankcase hole for retaining the gasket to the crankcase prior to attachment of the oil pan to the engine by screws or bolts. In this case, however, there is nothing to prevent the individual fastening screws or bolts from dropping or slipping out of the hand of the installer as the pan is manually lifted into engagement with the gasket.

U.S. Pat. No. 1,970,078, Dillon, shows an O-ring 18 that surrounds a fastening screw or bolt for retaining the same in one portion of a pipe coupling. However, this is merely a bolt retainer and does not provide a subassembly of a gasket and oil pan or similar device and attaching screw or bolt.

U.S. Pat. No. 4,394,853, Lopez-Crevillen et al, shows an oil pan with reinforcing plates formed integral with individual sleeves that accurately align with and project through the holes of the gasket for attachment purposes. However, the sleeves are not removable from the plates, nor do they form part of a subassembly that can be attached as a unit to the engine crankcase.

U.S. Pat. No. 1,980,335, Hewitt et al, U.S. Pat. No. 3,643,968, Horvath, and U.S. Pat. No. 4,535,996, Cardis et al, each show various metal inserts in an oil pan attaching gasket for limiting the compression of the gasket. The inserts, however, are not retaining clips for establishing a subassembly of the gasket, oil pan flange and attaching screw or bolt for easy assembly to an engine crankcase or the like.

From the above, it will be seen that the invention provides an accurate, fast and essentially foolproof method of assembling an engine oil plan or similar device to a crankcase or other part of the engine in a reliable manner with little danger of damage to the gasket.

Figure 2:
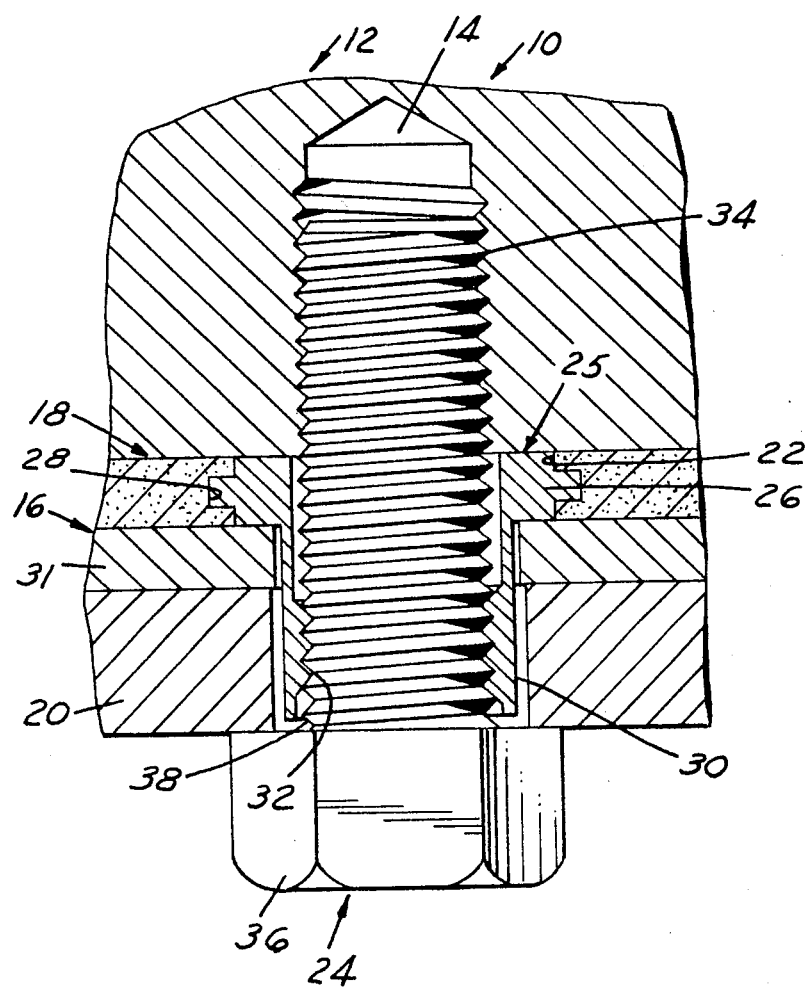

Other objects, features and advantages of the invention will become more apparent upon reference to the succeeding, detailed description thereof, and to the drawings illustrating the preferred embodiment thereof wherein:

FIG. 1 is an exploded, perspective view of a portion of an engine block and an oil pan assembly embodying the invention; and FIG. 2 is an enlarged cross-sectional view of a detail of FIG. 1.

FIG. 1 shows a portion 10 of the block of an automotive type internal combustion engine, separated from the usual cylinder head, etc., for clarity. Along the bottom of the block integral therewith is a horizontal oil pan mounting flange 12 having appropriately spaced bolt holes 14 for attachment of an oil pan 16 in the usual manner. A one-piece formed gasket 18 is adapted to be positioned between the crankcase and oil pan which, in this case, is a sheet metal stamping for which stiffening reinforcement plates 20 are provided.

As stated previously, the conventional manner of attaching an oil pan 16 to the engine block 10 would be to apply a bead of sealer to the crankcase flange 12, embed the gasket 18 in the sealer with the holes 22 in the gasket aligned with the bored crankcase holes 14, insert the fastening screws or bolts 24 through the reinforcing plates 20 and the rail of the oil pan 16, and while holding the same in place, lift the oil pan against the gasket and bolt the same to the crankcase. It will be evident that while in this condition of attachment, each bolt is inserted separately, and a slight misalignment of the oil pan with the gasket may cause the gasket to be moved laterally or to be stretched or for the bolts to be misaligned with the gasket holes in a way that would cause a tear in the gasket. This might ultimately lead to leakage, which would of course be undesirable.

FIG. 2 shows the subassembly of the invention incorporating a tubular like plastic retaining clip 25 that permits assembly of all of the parts together prior to attachment to the engine, in a reliable manner. More specifically, the clip has a washer-like base portion 26 molded into the wall of the gasket 18 with a tongue and groove type connection 28, as shown. Extending axially from base portion 26 is a sleeve portion 30 that is of sufficient length to extend through aligned holes in the rail or flange 31 of the oil pan 16 and the reinforcing plate 20. Internally, the sleeve is formed with a number of axially spaced annular ridges or teeth 32 adapted to grip the threaded shank or shaft 34 of a fastening bolt or screw 24 having a head portion 36. The ridges or teeth would be of a diameter providing an interference fit with the shank 34 of the bolt; however, the plastic sleeve portion 30 of the retaining clip would be pliable enough to permit removal or insertion of the shank 34 and yet grip and retain the shank in the position shown or any desired position to complete the subassembly.

It thus will be seen that when the bolt is inserted through the clip as shown, with the head 36 up against the underside of the reinforcement plate, the retaining clip 25 molded into the gasket will grip the shank of the retaining bolt or fastener frictionally in a manner to resiliently hold the gasket 18, oil pan rail 31, reinforcement plate 20 and bolt 24 all together as a subassembly. With this procedure being duplicated for each hole in the oil pan rail, it then becomes a relatively simple matter to raise the oil pan flat up against the engine crankcase aligning all of the extended shanks 34 of the bolts with the crankcase holes at the same time for an easy attachment of the oil pan to the crankcase without any of the parts of the subassembly such as the bolts becoming dislodged or dropping accidentally. A small axial clearance 38 between the end of the retaining clip and the head of the bolt permits enough compression of the gasket for a final seating and sealing upon torquing each bolt 24 the proper amount.

From the foregoing, therefore, it will be seen that the invention provides a one-piece plastic clip that is embedded in the gasket for retaining several portions of a subassembly together prior to attachment of the subassembly as a unit to the engine per se, and that the subassembly prevents accidental dislodgement of any of its parts so that the oil pan may be easily attached to the engine.

While the invention has been shown and described in its preferred embodiment as attaching an oil pan to an engine crankcase, it will be clear that many changes and modifications may be made thereto and other uses made without departing from the scope of the invention. For example, it will be clear that another use for the retaining clip could be to connect an engine rocker valve cover to the engine cylinder head with a gasket by first preassembling the gasket and valve cover and any reinforcment member necessary and then attaching the subassembly to the cylinder head.

We claim:

1. A gasket subassembly removably securing an engine gasket part to engine fastener and other parts prior to attachment of the subassembly to a portion of the engine, comprising, a gasket part overlying and contiguous to one side of an engine part to be attached to the engine, and a fastener screw or bolt part for attachment of the subassembly to the engine, the gasket and engine part having a screw or bolt hole thereon, the gasket having integrally formed in the hole a retaining clip having a washer-like base fixedly mounted to the gasket in the hole and a pliable tubular portion projecting therefrom through the engine part hole, and the fastening screw or bolt part having a shaft insertable through the tubular portion and base for attachment to the engine and a head part engageable with the opposite side of the engine part for resiliently securing the subassembly together, the clip having formed internally thereof a plurality of axially spaced teeth of an internal diameter less than the outside diameter of the shaft for releasably gripping the shaft with an interference fit upon insertion of the shaft through the clip to resiliently lock the parts together as a subassembly.

2. A retaining clip for resiliently securing a plurality of parts of an engine subassembly together prior to attachment of the subassembly to the engine comprising, an engine part and a gasket overlying a portion of the top side of the engine part and each having at least one hole therein, the holes being aligned with one another for insertion therethrough of a fastening screw or bolt for attachment of the subassembly to the engine, the clip including a tubular member having a base portion anchored to the gasket in the gasket hole and a pliable sleeve portion extending from the base portion through the engine part, a fastening screw or bolt having a head portion and a shank portion, the shank portion being insertable through the clip sleeve and base portions to a position abutting the head portion with the underside of the engine part, the clip sleeve portion having formed internally thereof axially spaced tooth means for gripping the shaft and retaining the latter in place to resiliently lock the gasket and engine and screw or bolt parts together, the tooth means being of a diameter providing an interference fit with the shaft for maintaining the shaft in place while permitting relative movement therebetween for removal or insertion of the shaft.

3. A clip as in claim 2, wherein the engine part comprises an oil pan rail and an oil pan reinforcing plate between the gasket part and head portion.

4. A clip as in claim 2, the base portion being formed integral with the gasket, the sleeve portion tooth means comprising annular axially spaced ridges formed on the internal diameter of the sleeve portion.

* * * * *